3,484,198
DECOMPOSITION OF ILMENITE
Moshe Rudolf Bloch, Beersheba, Isaac Schnerb, Jerusalem, and Joachim Kenat, Beersheba, Israel, assignors to Dead Sea Works Limited, Beersheba, Israel, an Israeli company
No Drawing. Filed Dec. 5, 1966, Ser. No. 598,949
Claims priority, application Israel, Dec. 15, 1965, 24,806
Int. Cl. C01c 45/02; C01g 23/04
U.S. Cl. 23—200                            2 Claims

ABSTRACT OF THE DISCLOSURE

A method is provided for converting iron oxide to iron tribromide in ilmenite while leaving the titanium dioxide unreacted, such process involving contacting the ilmenite with carbon and treating the mixture at a temperature under 1,000° C. with an admixture of bromine and an inert gas.

---

The present invention concerns a process for the decompositon of ilmenite by means of bromine in the pressure of an inert carrier gas.

Ilmenite is an iron-titanium oxide mineral which serves mainly as a raw material for the production of pure $TiO_2$. Conventionally $TiO_2$ is produced from ilmenite by a process which comprises as a first step treating the ilmenite with chlorine and carbon at an elevated temperature which yields a mixture of $FeCl_3$ and $TiCl_4$. Both these compounds are distillable and can thus be fractionated by fractionated distillation, which constitutes the second step of the known process. In a third step of pure $TiCl_4$ is hydrolyzed to yield HCl on the one hand and $Ti(OH)_4$ on the other hand which by calcination is converted into $TiO_2$.

In accordance with the present invention it has now surprisingly been found that if the temperature at which the ilmenite is contacted with carbon is kept below 1000° C., and the chlorine is replaced by bromine in admixture with an inert gas, the reaction is selective and only the iron oxide is converted into iron tribromide while the titanium oxide remains unaffected. This surprising result is in contrast to the conclusions that could be drawn from the literature (see for example J. Am. Chem. Sec. 52 (1930) 4233 and Pr. Roy. Sec. 8 (1856) 42–44).

Thus in accordance with the invention there is provided a process for the decomposition of ilmenite, comprising contacting the ilmenite with elementary carbon and bromine in the presence of an inert carrier gas at an elevated temperature not exceeding 1000° C., and recovering from the reaction mixture separately iron tribromide and unreacted titanium oxide.

Preferably the process according to the invention is carried out at a temperature of 800–900° C.

The inert carrier gas is preferably nitrogen or a mixture of nitrogen and carbon oxides. In the latter case the mixture can be produced in a coke furnace from which it is discharged at the desired temperature so that it can also serve as a source of heat for the reaction.

It has been found that the separation of Fe and Ti in accordance with the invention is complete. The $FeBr_3$ that forms in the reaction is withdrawn in gaseous form and condensed in solid form. In some cases this compound may be the desired end product. In other cases it may be desirable to convert the $FeBr_3$ by oxidation into pure $Fe_2O_3$ and to recycle the liberated bromine to the decomposition reaction.

The crude $TiO_2$, remaining after the bromine treatment of the ilmenite, can be reacted in a manner known per se with elementary chlorine to yield $TiCl_4$ which may again be converted into pure $TiO_2$ serving as a pigment, as equally known per se. The crude $TiO_2$ can also be worked up for elementary titanium, e.g. by reduction with metals such as magnesium.

For the purpose of the present invention various sources of elementary carbon can be used. Thus for example coke, especially petroleum coke, has been found very suitable. Preferably intimate solid mixtures of the ilmenite and carbon will be prepared before the heat treatment, e.g. by briquetting.

Where the $FeBr_3$ resulting from the process according to the invention is to be oxidatively decomposed into $Fe_2O_3$ and elementary bromine, it is possible to use air as the source of oxygen. The bromine-nitrogen mixture resulting from such an oxidation process can be used as it is in the decomposition of ilmenite in accordance with the invention, that is, without separation of the bromine from the nitrogen, which is an obvious advantage.

The process according to the invention offers a number of advantages, for example, the following:

(1) The decomposition of the ilmenite consumes only the amount stoichiometrically equivalent for reaction with the iron, while in conventional processes, chlorine is required for combination both with the iron and the titanium.

(2) As the decomposition is effected at a lower temperature than conventional processes, the requirements of energy are lower.

(3) Because of the complete selectivity of the process according to the invention in which the bromine attacks only the iron oxide, there arise virtually no problems regarding the separation of the iron and titanium compounds.

(4) The $FeBr_3$ can be shipped in the pure solid state. This offers a great advantage for the bromine industry since it enables to transport the bromine in the form of the completely harmless $FeBr_3$ instead of transporting it in the dangerous elementary form. The bromine can afterwards be liberated at the place where it is used. As is well known, elementary bromine is very corrosive and its transportation offers serious problems.

The invention is illustrated by the following example without being limited thereto.

EXAMPLE 9 parts by weight weight of Indian ilmenite containing 56% by weight of $TiO_2$ and 43% by weight of FeO (partly in the form of $Fe_2O_3$) are thoroughly mixed with 1 part by weight of powdered or briquetted coke. This mixture is continuously or intermittently charged into a rotary or vertical kiln which is heated in a conventional way (e.g. electrically or with the flue gases of a coke burner). At a temperature of 800–900° C. a gas mixture of 0.8 parts by volume of bromine and 10 parts by volume of nitrogen or another inert gas such as carbon oxide is introduced to the kiln in such an amount as to provide an excess of bromine therein. 17 parts of $FeBr_3$ are formed and leave the kiln with the hot flue gases.

The flue gases are water-cooled or air-cooled and then introduced into a cyclone where the $FeBr_3$ is separated as a powder from the flue gases.

The nitrogen with the excess bromine is recycled to the process.

The residue consists of 4.6 parts by weight of $TiO_2$, unattacked by the bromine and free of coke, in the form of a commercial concentrate containing 96–97% of $TiO_2$.

The 17 parts of $FeBr_3$ formed in the process are heated in a hot air stream, and at a temperature of 400–600° C. bromine is liberated and escapes with the gas. The residue is 4.7 parts of pure iron oxide ($Fe_2O_3$). The escaping bromine-nitrogen mixture can be recycled for the ilmenite treatment.

What we claim is:

1. Process for the decompositoin of ilmenite in the presence of about 10% by weight of elementary carbon, comprising contacting the ilmenite and carbon mixture with a gas mixture selected from the group consisting of a mixture of bromine and nitrogen and a mixture of bromine, nitrogen and carbon oxides at an elevated temperature not exceeding 900° C., recovering from the reaction mixture separately iron tribromide and unreacted titanium oxide, oxidatively decomposing the iron tribromide with air thereby producing iron oxide and recycling the resultant gas mixture containing bromine and nitrogen for the decomposition reaction of the said ilmenite.

2. Process according to claim 6, wherein the carbon source is coke and the ilmenite-coke mixture is briquetted before submission to elevated temperature.

References Cited

UNITED STATES PATENTS

| | | | |
|---|---|---|---|
| 1,552,786 | 9/1925 | Wescott | 23—200 |
| 1,845,342 | 2/1932 | Saklatwalla | 23—87 XR |
| 1,984,480 | 12/1934 | Henne | 23—87 |
| 2,184,884 | 12/1939 | Muskat et al. | 23—87 XR |
| 2,245,077 | 6/1941 | Muskat et al. | 23—87 XR |
| 2,443,254 | 6/1948 | Kroll et al. | 23—87 XR |
| 2,642,339 | 6/1953 | Sawyer | 23—200 |
| 2,677,598 | 5/1954 | Crummett et al. | 23—87 |
| 2,946,668 | 7/1960 | Richelsen | 23—87 XR |
| 2,954,274 | 9/1960 | Walsh | 23—87 |

OTHER REFERENCES

J. W. Mellor's "A Comprehensive Treatise on Inorganic and Theoretical Chemistry," vol. 2, 1922, p. 66. Longmans, Green & Co., New York.

McPherson and Henderson book "A Course in General Chemistry," p. 163 (Third edition, 1927), Ginn & Co., New York.

EDWARD STERN, Primary Examiner

U.S. Cl. X.R.

23—87, 202

PO-1050
(5/69)

UNITED STATES PATENT OFFICE
CERTIFICATE OF CORRECTION

Patent No. 3,484,198   Dated December 16, 1969

Inventor(s) BLOCH, Moshe Rudolf; SCHNERB, Isaac; KENAT, Joachim

It is certified that error appears in the above-identified patent and that said Letters Patent are hereby corrected as shown below:

In the printed patent, column 3, line 15:

"6" should read --1--.

SIGNED AND
SEALED
JUN 2 1970

(SEAL)
Attest:

Edward M. Fletcher, Jr.
Attesting Officer

WILLIAM E. SCHUYLER, JR.
Commissioner of Patents